June 16, 1942. T. A. JANNEY ET AL Re. 22,117

PROCESS OF RECOVERING MOLYBDENITE BY FROTH FLOTATION

Original Filed Jan. 9, 1939 2 Sheets-Sheet 1

THOMAS A. JANNEY,
ALPHA G. JOHNSON, and
CHARLES M. NOKES,
INVENTORS;

BY Arthur P. Knight and Alfred W. Knight
ATTORNEYS.

PROCESS OF RECOVERING MOLYBDENITE BY FROTH FLOTATION

Original Filed Jan. 9, 1939 2 Sheets-Sheet 2

THOMAS A. JANNEY,
ALPHA G. JOHNSON, and
CHARLES M. NOKES,
INVENTORS;
BY Arthur P. Knight and
Alfred W. Knight
ATTORNEYS.

Reissued June 16, 1942 Re. 22,117

UNITED STATES PATENT OFFICE 22,117

PROCESS OF RECOVERING MOLYBDENITE BY FROTH FLOTATION

Thomas A. Janney, Garfield, Alpha G. Johnson, Magna, and Charles M. Nokes, Salt Lake City, Utah Original No. 2,255,776, dated September 16, 1941, Serial No. 250,014, January 9, 1939. Application for reissue October 28, 1941, Serial No. 416,910

17 Claims. (Cl. 209—3)

Figure 2:
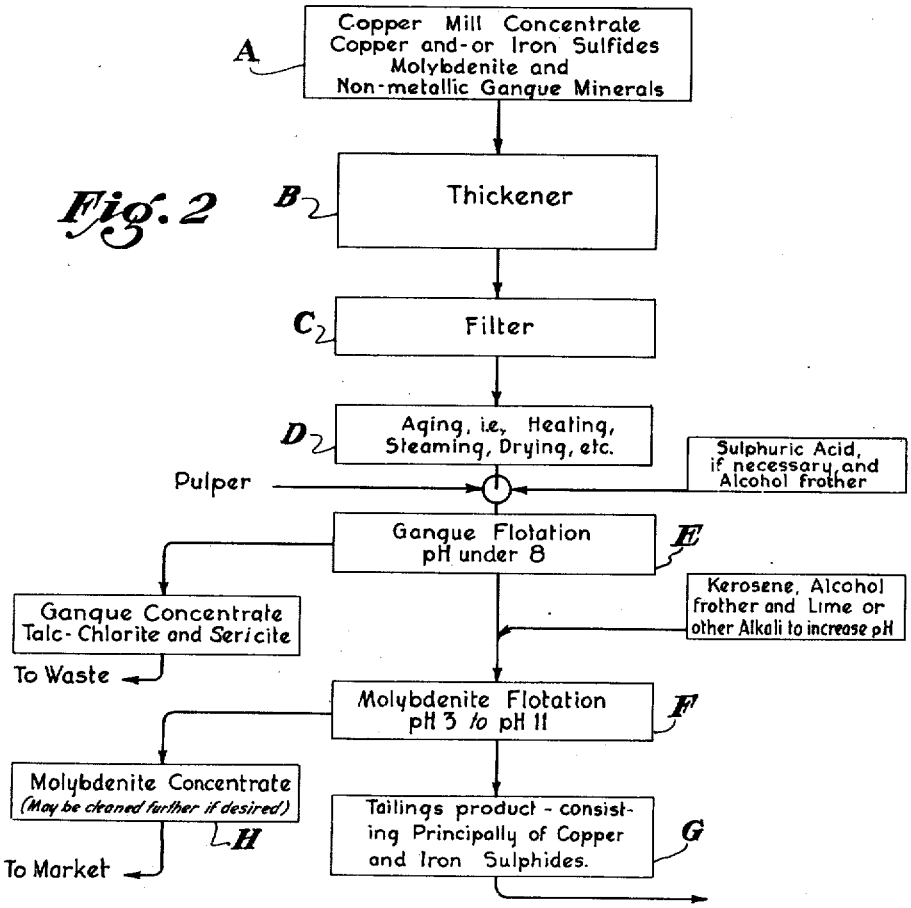

This invention relates to the froth flotation of ores and mill products for the recovery of molybdenite, and pertains particularly to the separation of molybdenite from other sulphides and gangue materials which, under usual conditions, tend to separate with the molybdenite.

As is well known, molybdenite usually occurs with other sulphide minerals, and is generally present in but a small percentage, wherefore a significant concentration of the ore is required in order to produce a marketable product. Molybdenite is a mineral which floats readily, due principally to its non-polar character, its non-oxidation, and to its micaceous habit. The recovery of molybdenite as a low-concentration product presents little difficulty, but considerable difficulty has been experienced in obtaining a high purity molybdenite concentrate by any hitherto-suggested procedure, without loss of an important percentage of the mineral in the recovery process. The copper and iron sulphides, for example, tend to float with molybdenite, as do certain gangue minerals, such as those of the talcose and chloritic type, all of which factors contribute to the difficulty of securing a high grade molybdenite product.

The present invention is directed to the recovery of molybdenite by methods involving selective froth flotation, providing for the separation and recovery of that mineral from concomitant metallic and non-metallic contaminants to a higher degree than has been hitherto considered possible, consistent with a high total recovery.

Under standard flotation conditions, with a given set of reagents and a given set of minerals in the material being treated, there will be a definite relation of flotation order (floatability) between the various minerals of the mineral aggregate, i. e., the several minerals will follow a certain scale of floatability. It is frequently necessary, in order to effect proper separation of such minerals, to alter this order of floatability, or to accentuate differences therein as by increasing or decreasing the selectivity index. This alteration is usually secured by the addition of certain reagents, such as the addition of lime and cyanide to depress pyrite and thus increase the selectivity index between chalcopyrite and pyrite, for example.

Where molybdenite is secured as a concentrate, by flotation thereof along with other sulphide minerals, and often contaminated with non-metallic minerals, considerable difficulty has been experienced in securing a further separation and concentration. For example, if a sulphide ore flotation concentrate containing about one per cent molybdenite, 30 per cent copper, and 25 per cent iron is refloated, there will be no significant change in the proportions of these minerals. It becomes necessary, therefore, to change the scale of floatability of these sulphide minerals, which is accomplished according to this invention by subjecting the material to an aging treatment, which will serve to depress the floatability of the sulphide minerals other than molybdenite. This aging treatment is one which will secure the production of an inhibitory agent or condition which will depress the floatability of the sulphide minerals other than molybdenite, and preferably is one which will effect an at least partial oxidation of such other minerals (molybdenite being not readily subject to oxidation), to effect a surface tarnishment of such other mineral particles. The treatment is preferably also such as to secure a substantially complete removal, as by decomposition, of the concomitant flotation reagent or reagents remaining from the previous flotation operation, if the material has been subjected to a previous flotation treatment, in order that a subsequent flotation of the product in the recovery of the molybdenite will not be influenced by any agent tending to secure or facilitate collection of the other sulphide minerals.

Where the molybdenite material is also contaminated with difficultly separated gangue materials, such as those of the talcose and chloritic types, it is further necessary to modify the order of floatability of the minerals to the end that the gangue material is effectively removed without loss of molybdenite. In this connection, a further object of the invention is to provide a flotation procedure for the removal of such contaminating gangue materials from a molybdenite-containing mineral aggregate, followed by a separation of the molybdenite from the other sulphide minerals.

An important object of the invention is to provide for the recovery of molybdenite from a mineral aggregate containing other metallic sulphides, involving the aging of the aggregate to decrease the floatability of such other sulphides and thus facilitate the separation of molybdenite therefrom.

A further object of the invention is to provide a process of separating molybdenite from a mineral aggregate containing other metallic sulphides and a non-metallic gangue, involving the aging of the aggregate to change the order of floatability of the constituents, and the subsequent flotation of the aggregate under controlled conditions of pH, in which the gangue material is separated from the sulphide minerals under acid or faintly alkaline conditions, and the molybdenite subsequently separately from the other sulphide minerals under conditions of higher pH, and preferably under alkaline conditions.

The aging treatment required according to the present invention will be dependent upon the character of the mineral aggregate undergoing treatment, for example, where the sulphide minerals other than molybdenite are in a fairly advanced stage of oxidation, a relatively mild aging treatment is adequate; where the aggregate is one in which the sulphide minerals other than molybdenite are practically free of primary oxidation, a more drastic aging treatment is necessary. The Chino Copper Company general mill concentrates (from the Chino operations of the Nevada Consolidated Copper Company) are illustrative of the first class of mineral aggregates, and the Utah Copper Company concentrates (from the operations near Garfield, Utah) are illustrative of the second class.

For the treatment of the materials, the aging operation may comprise heating, atmospheric drying, steaming, boiling in water, and the like. Inasmuch as it is also necessary to eliminate or render inactive any residual flotation reagent present as a result of the preliminary concentration, the character of the aging will be controlled by the ease or difficulty with which such reagent or reagents may be eliminated. For example, a collector such as butyl xanthate which is quite useful in the treatment of the fairly well oxidized mineral aggregates, may readily be decomposed, whereas with the purely sulphide mineral types of aggregate a collector such as sodium dicresyl dithiophosphate is frequently necessary, which will necessitate a somewhat drastic heat treatment in order to decompose it. For the proper aging of the purely sulphide aggregate, therefore, heating for a relatively long period at temperatures as low as 300° F., or a short heating at temperatures as high as 700° F. are useful, for example, a heat treatment at 450° to 550° F. for a few minutes (fifteen minutes, for example) is effective to secure both the partial oxidation or tarnishment and the removal of the more stable reagent. This specific temperature range is not essential, however, inasmuch as practically any heating operation, if continued for a sufficient time, and in the presence of oxygen such as from atmospheric air, will effect the desired aging. The temperature limitations will obviously be dictated by the expediency of the operation at a particular location and by the availability of equipment.

For the separation of moybdenite from an aged mineral aggregate having a relatively low content of insoluble gangue, flotation with any desired collector for molybdenite (such as kerosene) and a frother, preferably an alcoholic frother, will cause the molybdenite to be collected in the froth and the other sulphide minerals to remain principally in the tailings. Concentrations up to about 95 per cent $MoS_2$ have been obtained in this manner.

For the separation of molybdenite from a material containing readily floatable gangue materials, such as those of the talcose, chloritic, or micaceous types, a somewhat modified procedure is followed, in which the aged material is first subjected to a flotation treatment to float the gangue away from the sulphide minerals, including molybdenite, while maintaining the pulp on the acid or faintly alkaline side, i. e., at a pH below 8, and the tailings from that flotation treatment are then subjected to further flotation in the presence of a collector for molybdenite, at a pH greater than that of the previous flotation and in any event greater than 3, in which the molybdenite is recovered in the froth and the other sulphide minerals remain almost entirely in the tailings. By this procedure concentrates running in excess of 90 per cent $MoS_2$ have been obtained, with as low as 0.25 per cent copper.

In connection with the above type of procedure, the desirable pH value for the gangue flotation step may in some cases be obtained as a result of the production of acid compounds in heating or other aging process employed, although it will be realized that additional acid such as sulphuric or an alkaline reagent such as lime, may be added, if necessary, to establish the pH value at the desired point.

As a specific illustration of the practice of the invention on a mineral aggregate containing a low proportion of difficultly removed insoluble gangue, in which the sulphide minerals were in a fairly advanced stage of oxidation and illustrative of the first class of materials, a concentrate fresh from production at Chino Concentrators, Nevada Consolidated Copper Company, containing approximately one per cent $MoS_2$, 30 per cent copper, 25 per cent iron, and 4 per cent gangue, was subjected to test. This concentrate, when refloated immediately, wthout aging treatment, showed no separation of molybdenite from its associated minerals. Various aging procedures were carried out, ranging from (*a*) atmospheric drying, (*b*) heating in water, (*c*) drying on a steam hotplate, (*d*) drying on a steam hotplate followed by continued heating after reaching dryness, (*e*) passing live steam into the pulp and maintaining boiling temperature for thirty minutes, and (*f*) allowing the pulp to stand in native water for periods ranging from 24 to 192 hours. In each case flotation subsequent to an aging treatment resulted in the production of a molybdenite concentrate containing at least ten times as much molybdenite as the feed material, and in all tests except two the molybdenite proportion in the concentrate was in excess of 40 per cent, and for the most part in excess of 60 per cent, while in the case of the steam hotplate-dried material which was heated further after reaching dryness (procedure *d*) a concentrate containing 94.66 per cent $MoS_2$ was obtained. In each instance the tailing product was sufficiently low in $MoS_2$ as to be considered waste material as far as its molybdenite content was concerned.

Figure 1:
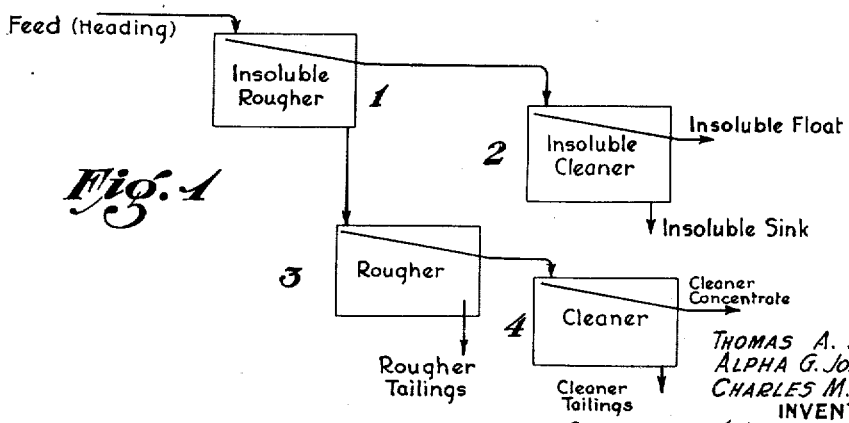

As an illustration of the effect which heat-treating or aging has upon the second type of mineral aggregate, two flotation procedures were carried out on a Utah Copper Company mill concentrate, one sample being subjected to the flotation procedure without pre-treatment, and the other sample being subjected to a four-hour drying at 195° C. prior to the flotation process. The accompanying drawings, Fig. 1, may be used to visualize the flotation treatment, in which the feed was subjected to flotation with an alcoholic frother at 1, which is designated as the "Insoluble rougher." The froth from this treatment was subjected to a cleaning operation at 2, producing an "Insoluble float" which was discarded as waste, and an "Insoluble sink" which was returned to the circuit for further treatment. The tailing material from 1, which contained the bulk of the molybdenite, was subjected to a second rougher treatment as at 3, with the addition of kerosene and pine oil for the recovery of molybdenite, producing a tailings product designated as "Rougher tailing" which was discarded as inert to the flotation agencies employed, and a float which was cleaned as at 4, in the production of a "Cleaner concentrate" which represented the molybdenite product and a "Cleaner tailings" which was returned to 3 for recovery of the $MoS_2$ value.

The results of the above tests are set forth in the following Table I, in which the various products are designated as above set forth, showing the percentages of copper, insoluble material and molybdenite with their percentage distribution.

*Table I*

| Procedure | Test #1 | Test #2 |
|---|---|---|
| | Not heat-treated | Heat-treated |
| | Orig. conc. direct from production. Removal of insol. conc. by alcohol frother and removal of $MoS_2$ conc. by kerosene and pine oil | Orig. conc. dried 4 hours at 195° C. Float. same as in Test #1 |
| Heading (assay): | | |
| Percent Cu | 34.50 | 34.50 |
| Percent insol | 9.00 | 9.00 |
| Percent $MoS_2$ | 1.57 | 1.57 |
| Insol. float: | | |
| Percent wt | 48.93 | 1.87 |
| Percent Cu | 37.50 | 1.80 |
| Percent dist. Cu | 54.24 | .09 |
| Percent insol | 2.40 | 89.80 |
| Percent dist. insol | 12.86 | 19.20 |
| Percent $MoS_2$ | .30 | .12 |
| Percent dist. $MoS_2$ | 9.86 | .13 |
| Insol. sink: | | |
| Percent wt | 44.88 | .92 |
| Percent Cu | 32.80 | 30.95 |
| Percent dist. Cu | 43.51 | .81 |
| Percent insol | 12.20 | 18.20 |
| Percent dist, insol | 60.67 | 1.94 |
| Percent $MoS_2$ | 2.81 | 1.07 |
| Percent dist. $MoS_2$ | 84.58 | .63 |
| Ro. tailing: | | |
| Percent wt | 3.23 | 91.02 |
| Percent Cu | 10.00 | 35.90 |
| Percent dist. Cu | .95 | 94.72 |
| Percent insol | 47.20 | 7.00 |
| Percent dist, insol | 16.70 | 72.80 |
| Percent $MoS_2$ | .27 | .04 |
| Percent dist. $MoS_2$ | .60 | 2.26 |
| Cl. conct. ($MoS_2$): | | |
| Percent wt | 1.63 | 1.94 |
| Percent Cu | 14.65 | 5.90 |
| Percent dist. Cu | .71 | .12 |
| Percent insol | 19.80 | 7.10 |
| Percent dist. insol | 3.52 | 1.60 |
| Percent $MoS_2$ | 3.90 | 73.40 |
| Percent dist. $MoS_2$ | 4.29 | 89.56 |
| Cl. tailing: | | |
| Percent wt | 1.33 | 4.25 |
| Percent Cu | 15.20 | 34.70 |
| Percent dist. Cu | .59 | 4.26 |
| Percent insol | 42.80 | 9.20 |
| Percent dist. insol | 6.26 | 4.46 |
| Percent $MoS_2$ | .73 | 2.78 |
| Percent dist. $MoS_2$ | .67 | 7.42 |

It will be seen that the heat treatment (aging) was beneficial from several standpoints, namely, there was a greater rejection of copper and insoluble into the Rougher tailing, a larger accumulation of molybdenite in the Cleaner concentrate (on the basis of total recovery), and a higher degree of purification in the final product.

The data shown in the following Table II illustrates the effect of pH control in the insoluble flotation and the molybdenite flotation. The material treated represents a mill concentrate enriched in $MoS_2$ and which had undergone heat treatment to secure the desired aging. A flotation procedure such as that outlined in Fig. 1 was practiced, the "Insoluble float" product representing the froth product from the rougher 1, the "Rougher tailing" product representing the waste material from rougher 3, the "Cleaner tailing" representing the tailings product from the cleaner 4, and the "Cleaner concentrate" representing the float material from the cleaner 4. The procedure differed from that used to obtain the data shown in Table I only in the respect that lime was added at rougher 3 to put the pH of the pulp on the basic side for the data shown in the right-hand column (Test 4), while the pH of the pulp was unchanged for the data shown in the left-hand column (Test 3).

*Table II*

| | Test No. 3, no lime for $MoS_2$ | Test No. 4, lime for $MoS_2$ |
|---|---|---|
| Heading: | | |
| Percent Cu | 9.11 | 9.11 |
| Percent insol | 44.40 | 44.40 |
| Percent $MoS_2$ | 23.82 | 23.82 |
| Ro. insol. float: | | |
| pH | 5.55 | 5.55 |
| Percent wt | 22.34 | 22.96 |
| Percent Cu | 2.74 | 3.88 |
| Percent dist. Cu | 7.56 | 10.76 |
| Percent insol | 81.58 | 81.67 |
| Percent dist. insol | 41.53 | 41.88 |
| Percent $MoS_2$ | 1.82 | 1.89 |
| Percent dist. $MoS_2$ | 1.75 | 1.88 |
| | No lime added here | Lime added here |
| Ro. tailing: | | |
| pH | 5.55 | 9.18 |
| Percent wt | 48.18 | 47.70 |
| Percent Cu | 13.25 | 13.66 |
| Percent dist. Cu | 79.05 | 78.72 |
| Percent insol | 44.98 | 46.22 |
| Percent dist. insol | 49.41 | 49.90 |
| Percent $MoS_2$ | 5.84 | 2.20 |
| Percent dist. $MoS_2$ | 12.00 | 4.59 |
| Cleaner tailing: | | |
| Percent wt | 9.19 | 7.22 |
| Percent Cu | 10.98 | 11.28 |
| Percent dist. Cu | 12.52 | 9.79 |
| Percent insol | 32.05 | 35.61 |
| Percent dist. insol | 6.72 | 5.82 |
| Percent $MoS_2$ | 20.14 | 15.47 |
| Percent dist. $MoS_2$ | 7.90 | 4.90 |
| Cl. concentrate: | | |
| Percent wt | 20.29 | 22.12 |
| Percent Cu | .345 | .290 |
| Percent dist. Cu | .87 | .73 |
| Percent insol | 5.06 | 4.78 |
| Percent dist. insol | 2.34 | 2.40 |
| Percent $MoS_2$ | 90.41 | 91.70 |
| Percent dist. $MoS_2$ | 78.35 | 88.63 |
| Reagents, lbs./ton: | | |
| Lime | None | 8.3 |
| Kerosene | 2.15 | 2.15 |
| Alcohol frother | .67 | .67 |

Fig. 2 of the accompanying drawings illustrates a flow sheet indicating typical steps in the process for treating mineral aggregates carrying a relatively large proportion of gangue material, and referring thereto, a source of partially concentrated molybdenite-containing sulphide mineral is indicated at A, from which material is drawn into a thickener B and thence to a filter C. The filtered mineral is withdrawn from the filter C and subjected to an aging operation at D to cause the order of floatability to be altered, as above described, which operation may comprise drying, dry heating, steaming, boiling in water, or the like, at a temperature adequate to decompose or otherwise render inert any residual reagents from the preliminary concentrating step practiced before the material is supplied to A, and to cause an at least partial oxidation of the metallic sulphides other than molybdenite, this at least partial oxidation resulting in a more acid pulp.

Sulphuric acid may be added at this point, if necessary, to lower the pH of the pulp to a value below 8 and preferably to a value in the range of pH 3 to pH 8, together with a suitable frother (such as an alcohol frother of the type marketed by the Du Pont de Nemours Company under the trade symbol "B-22"). The pulp is then subjected to floation at E, to separate the gangue material as a float, and the "tailings" from this flotation operation are then treated with lime or other alkaline reagent to bring the pH value thereof to a value greater than that of the previous circuit, preferably within the range of pH 3 to pH 10 or 11. Kerosene or other comparable collector for molybdenite is then added, together with a suitable frother, preferably an alcoholic frother such as above described, and the pulp subjected to a further flotation as at F, in which operation the molybdenite is recovered in the froth and the iron and copper sulphides are kept in the tailings. The sulphide tailings G may be treated for the recovery of the copper values by conventional smelting procedure, as will be apparent to one skilled in the art. The molybdenite concentrate from F, indicated at H, will be of high grade, and constitutes a marketable product.

It will be appreciated that the scheme outlined in Fig. 2 may also be applied to the treatment of a molybdenite-containing mineral aggregate containing a nominal amount of gangue by omitting the gangue flotation step, i. e., by passing the material from step D directly to step F, without intermediate flotation of the insolubles.

The pH of the insoluble and molybdenite flotation circuits is variable, and the optimum pH for a specific flotation procedure will depend upon the character of the feed and upon the nature of the aging treatment given such feed. In general, the lower the pH in the insoluble float, the better the inhibition of the flotation of the molybdenite. The use of a pH of much less than 3.0 in the insoluble flotation circuit is ordinarily impracticable, due both to the highly corrosive nature of the pulp at such values, and to a partial reactivation of the copper and iron sulphides which apparently results from solution of the tarnished surfaces. Where acid-proof equipment is employed, values less than pH 3.0 may be utilized, and, similarly, where the float from the insoluble flotation is to be returned to treatment for recovery cf copper values, pH values less than 3 are fully operative in the insoluble circuit.

Furthermore, the proportion of "insoluble" in the feed will affect the optimum pH in the insoluble flotation step and the molybdenite flotation step; for example, a high insoluble content in the pulp will have the effect of inhibiting the flotation of $MoS_2$, wherefore a higher pH may be utilized without undue loss of $MoS_2$ in the insoluble float than could be utilized where the insoluble content was low, but the presence of a high insoluble residue in the tailings from the insoluble floating operation would likely require a more alkaline condition in the subsequent molybdenite flotation to keep down flotation of insoluble with the $MoS_2$ in the production of the $MoS_2$ concentrate. These conditions, and the effect thereof on the preferred practice of the invention will be apparent to those skilled in the flotation art.

The activation of $MoS_2$ in the succeeding molybdenite flotation increases toward a pH in the neighborhood of 11. The tendency for copper to float with the molybdenite gradually increases to a certain pH, generally in the neighborhood of 5 to 6, then decreases with a further increase of pH up to a certain value, generally in the neighborhood of pH 7 to pH 9, and then increases. The optimum pH in the molybdenite flotation operation, therefore, will be seen to be dictated by the character of the concentrate desired.

The character of the aging treatment affects the optimum pH in the molybdenite flotation operation, and, in general, the more rigorous the aging treatment, the lower the optimum pH from the standpoint of both $MoS_2$ recovery and copper rejection.

Figure 3:
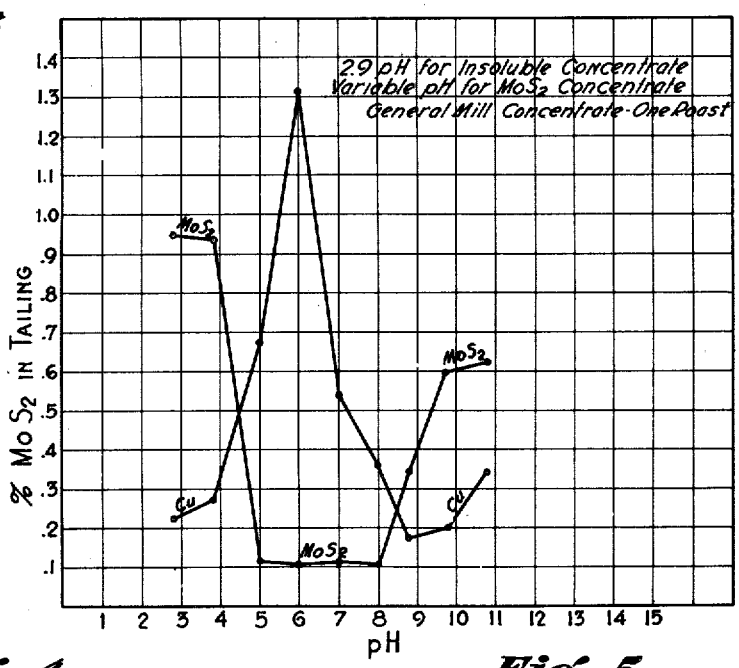
Figure 4:
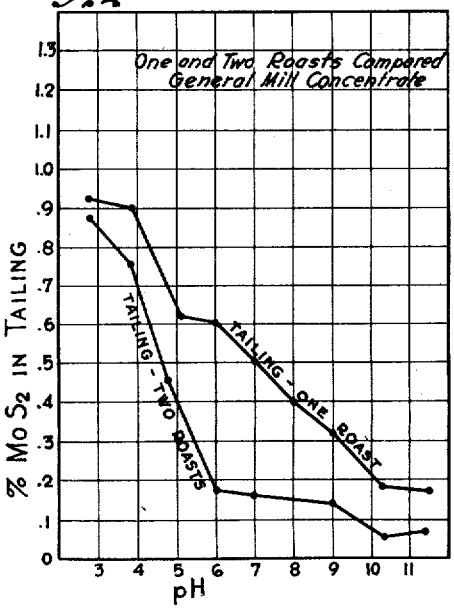
Figure 5:
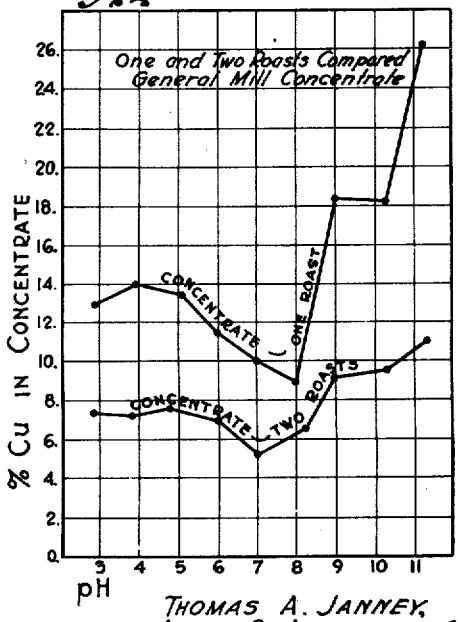

Figs. 3 to 5 illustrate the above general principles graphically. The values given in these figures are for a particular feed, namely, one in which the sulphide minerals were practically free of primary oxidation, and are offered as examples only, as different values would result if a different feed were employed, or if different aging treatments were used.

Fig. 3 illustrates the variation in the loss of $MoS_2$ in the tailing product of the molybdenite flotation, and the copper contamination of the concentrate from such flotation, as the pH of the molybdenite flotation is varied between 2.9 and 10.8 (the previous insoluble flotation being conducted at pH 2.9 in each instance). It will be seen that the $MoS_2$ loss is least at from pH 5 to pH 8, while the copper contamination reaches a maximum at pH 6, drops to a minimum at pH 8.8 and again rises with an advance of pH.

Figs. 4 and 5 represent, respectively, the $MoS_2$ loss in the tailing and the copper contamination in the concentrate, at different pH values for the molybdenite flotation (rougher operation), the solid line curves representing the values obtained when the feed material (Utah Copper Company general mill concentrate) had been aged by roasting for thirty minutes at 450° F. The broken line curves represent the values obtained when the feed material was subjected to a re-roast of thirty minutes at 475° F. before flotation. From these curves it will be seen that the maximum $MoS_2$ recovery takes place at the high pH values and the optimum copper rejection is at intermediate values. The curves for the roasted and re-roasted materials have a general similarity as to trend, but there is a better $MoS_2$ recovery and a better copper rejection at a given pH for the re-roasted feed than for the once-roasted material.

The present invention is not to be considered as limited to the specific embodiments herein described, but rather to the scope of the subjoined claims. The pH desired for the insoluble float may be obtained for the most part as a direct result of the aging treatment, due to the formation of products of acid reaction in the at least partial oxidation resulting from such aging, although additional acid such as sulphuric acid may be added to the pulp if desired. The pH of the pulp should be so controlled as to give the best metallurgical results, caution being exercised against values such as to dissolve off the tarnished coatings acquired in the roasting or aging process. In the case where efforts are made to guard against corrosion of machinery, obviously the pH must be kept within operating limitations. Should the pH of the pulp after aging of the material be less than desired, a suitable alkaline agent such as lime, or an alkali carbonate or hydroxide may be added to the pulp to bring the pH up to any desired value under 8.0. Similarly, we may use alkaline carbonates, alkali hydroxides, or lime for the purpose of raising the pH of the material for the molybdenite flotation, to establish a pH greater than that of the insoluble flotation circuit and not in excess of pH 11. The pH in the $MoS_2$ circuit should not reach excessively high values, because here this mineral tends to resist flotation and thus a loss through tailing discharge would result. The specific flotation procedures are described as including the use of alcoholic frothers, and while it has been found that alcoholic frothers of the aliphatic monohydric type, and particularly those having a carbon atom range of 5 to 7, are especially useful in the present invention, it will be appreciated that other frothers may be found equally effective, and may be used to carry out the present invention.

We claim:

1. In the separation of molybdenite from a mineral aggregate including other sulphides such as iron and copper sulphides, and gangue materials, by froth flotation, the improvement which comprises: subjecting such a mineral aggregate to a heating treatment at a superatmospheric temperature in the presence of oxygen to effect an oxidation of such other sulphides, said treatment being ineffective to cause substantial oxidation of such molybdenite and effective to materially depress the floatability of such other sulphides with respect to that of such molybdenite and then subjecting the so treated aggregate to froth flotation to recover the molybdenite therefrom.

2. The improvement set forth in claim 1, in which such heating treatment comprises roasting the aggregate at a temperature in the neighborhood of from 300° to 700° F.

3. In the separation of molybdenite from a mineral aggregate including other sulphides such as iron and copper sulphides, and gangue materials, by froth flotation, the improvement which comprises: subjecting such a mineral aggregate to an oxidation treatment at a superatmospheric temperature in the presence of moisture to effect an oxidation of such other sulphides, said treatment being ineffective to cause substantial oxidation of such molybdenite and effective to materially depress the floatability of such other sulphides with respect to that of such molybdenite, and then subjecting the so treated aggregate to froth floation to recover the molybdenite therefrom.

4. In the separation of molybdenite from a mineral aggregate including other sulphides such as iron and copper sulphides, and gangue materials, by froth flotation, the improvement which comprises: subjecting such a mineral aggregate to an aging treatment to effect an oxidation of such other sulphides by heating such aggregate at a superatmospheric temperature in the presence of oxygen, said treatment being ineffective to cause substantial oxidation of such molybdenite and effective to materially depress the floatability of such other sulphides with respect to that of such molybdenite; subjecting the aged aggregate to froth flotation at a pH less than 8 to produce a tailings product containing the principal proportion of the molybdenite present in such aggregate; and subsequently subjecting such tailings product to froth flotation at a pH higher than that obtaining in the first-mentioned froth flotation in the presence of a molybdenite collector to produce a float product consisting principally of molybdenite.

5. The improvement set forth in claim 4, in which the aging treatment comprises roasting the aggregate at a temperature in the neighborhood of 300° to 700° F.

6. In the separation of molybdenite from a mineral aggregate including other sulphides such as iron and copper sulphides, and gangue materials, by froth flotation, the improvement which comprises: subjecting such a mineral aggregate to an aging treatment to effect an oxidation of such other sulphides by heating such aggregate at a superatmospheric temperature in the presence of oxygen, said heating treatment being ineffective to cause substantial oxidation of such molybdenite and effective to materially depress the floatability of such other sulphides with respect to that of such molybdenite; subjecting the so treated aggregate to froth flotation at a pH less than 8 to produce a tailings product containing the principal proportion of the molybdenite present in such aggregate; and subsequently subjecting such tailings product to froth flotation in the presence of a molybdenite collector at a pH greater than that obtaining in the first-mentioned froth flotation and within the range of pH 3 to pH 11, to produce a float product consisting principally of molybdenite.

7. In the separation of molybdenite from a mineral aggregate including other sulphides such as iron and copper sulphides and gangue materials, by froth flotation, the improvement which comprises: subjecting such a mineral aggregate to an aging treatment to effect an oxidation of such other sulphides by heating such aggregate at a superatmospheric temperature in the presence of oxygen, said heating treatment being ineffective to cause substantial oxidation of such molybdenite and effective to materially depress the floatability of such other sulphides with respect to that of such molybdenite; subjecting the so treated aggregate to froth flotation in the presence of a frothing agent comprising one or more aliphatic monohydric alcohols of from 2 to 12 carbon atoms, at a pH less than 8 to produce a tailings product containing the principal proportion of the molybdenite present in such aggregate; and subsequently subjecting such tailings product to froth flotation in the presence of a molybdenite collector and a frothing agent comprising one or more aliphatic monohydric alcohols of from 2 to 12 carbon atoms at a pH greater than that obtaining in the first-mentioned froth flotation and within the range of pH 3 to pH 11 to produce a float product consisting principally of molybdenite.

8. In the separation of molybdenite from a mineral aggregate including other sulphides such as iron and copper sulphides, and gangue materials, by froth flotation, the improvement which comprises: subjecting such mineral aggregate to an aging treatment to effect an oxidation of such other sulphides by heating such aggregate at a superatmospheric temperature in the presence of oxygen, said treatment being ineffective to cause substantial oxidation of such molybenite and effective to materially depress the floatability of such other sulphides with respect to that of such molybdenite; subjecting the aged aggregate to froth flotation at a pH less than 8 to produce a tailings product containing the principal proportion of the molybdenite present in such aggregate; and subsequently subjecting such tailings product to froth flotation at a pH higher than that obtaining in the first-mentioned froth flotation but not in excess of pH 9, in the presence of a molybdenite collector, to produce a float product consisting principally of molybdenite.

9. The improvement set forth in claim 8, in which the aging treatment comprises roasting the aggregate at a temperature in the neighborhood of 300° to 700° F.

10. In the separation of molybdenite from a mineral aggregate including other sulphides such as iron and copper sulphides, and gangue materials, by froth flotation, the improvement which comprises: subjecting such a mineral aggregate to a heating treatment at a superatmospheric temperature in the presence of oxygen to effect an oxidation of such other sulphides, said treatment being ineffective to cause substantial oxidation of such molybdenite and effective to materially depress the floatability of such other sulphides with respect to that of such molybdenite, and then subjecting the so heated aggregate to froth flotation in the presence of a frothing agent comprising one or more aliphatic monohydric alcohols of from 2 to 12 carbon atoms, to separate the principal proportion of gangue materials therefrom.

11. The improvement set forth in claim 10, in which the aging treatment comprises roasting the aggregate at a temperature in the neighborhood of from 300° to 700° F.

12. In the separation of molybdenite from a mineral aggregate including other sulphides such as iron and copper sulphides, and gangue materials, by froth flotation, the improvement which comprises: subjecting such a mineral aggregate to an aging treatment to effect an oxidation of such other sulphides by heating such aggregate at a superatmospheric temperature in the presence of oxygen, said treatment being ineffective to cause substantial oxidation of such molybdenite and effective to materially depress the floatability of such other sulphides with respect to that of such molybdenite; subjecting the aged aggregate to froth flotation at a pH less than 8 and in the presence of a frothing agent comprising one or more aliphatic monohydric alcohols of from 2 to 12 carbon atoms, to produce a tailings product containing the principal proportion of the molybdenite present in such aggregate; and subsequently subjecting such tailings product to froth flotation at a pH higher than that obtaining in the first-mentioned froth flotation in the presence of a frothing agent comprising one or more aliphatic monohydric alcohols of from 2 to 12 carbon atoms, and a molybdenite collector, to produce a float product consisting principally of molybdenite.

13. The improvement set forth in claim 12, in which the aging treatment comprises roasting the aggregate at a temperature in the neighborhood of from 300° to 700° F., and in which the last-mentioned froth flotation is conducted at a pH not in excess of 11.

14. In the separation of molybdenite from a mineral aggregate including other sulphide minerals such as iron and copper sulphides and gangue materials by subjecting the mineral aggregate to a first froth flotation in the presence of a xanthate collector for such other metallic sulphides to produce an intermediate concentrate containing the principal portion of the molybdenite and the other metallic sulphides, and thereafter subjecting said intermediate concentrate to a second froth flotation in the presence of a molybdenite collector to produce a float product containing the principal proportion of said molybdenite and a tailings product containing the principal proportion of the other sulphide minerals, the step which comprises substantially completely removing from said intermediate concentrate prior to said second froth flotation the residual quantities of said xanthate collector by heating said intermediate concentrate in the presence of moisture.

15. In the separation of molybdenite from a mineral aggregate including other sulphide minerals such as iron and copper sulphides in a state of partial oxidation and gaugue materials by subjecting the mineral aggregate to a first froth flotation in the presence of a xanthate collector for such other metallic sulphides to produce an intermediate concentrate containing the principal portion of the molybdenite and the other metallic sulphides, and thereafter subjecting said intermediate concentrate to a second froth flotation in the presence of a molybdenite collector, the step which comprises substantially completely removing from said intermediate concentrate prior to said second froth flotation the residual quantities of said xanthate collector for such other sulphides by heating said intermediate concentrate in the presence of water.

16. In the separation of molybdenite by flotation from a bulk flotation concentrate produced from a mineral aggregate including other sulphide minerals such as iron and copper sulphides and gangue materials by subjecting the mineral aggregate to a first froth flotation in the presence of a collector for such other metallic sulphides, the step which comprises subjecting said bulk flotation concentrate to a treatment selected from the group consisting of atmospheric drying, heating in water, drying on a hot plate, drying followed by heating after reaching dryness, heating with live steam, roasting, and standing in water, until said collector is substantially completely removed.

17. In the separation of molybdenite by flotation from a bulk flotation concentrate produced from a mineral aggregate and including other sulphide minerals such as iron and copper sulphides in a state of partial oxidation and gangue materials by subjecting the mineral aggregate to a first froth flotation in the presence of a collector for such other metallic sulphides, the step which comprises subjecting said bulk flotation concentrate to a treatment selected from the group consisting of atmospheric drying, heating in water, drying on a hot plate, drying followed by heating after reaching dryness, heating with live steam, roasting, and standing in water, until said collector is substantially completely removed.

THOMAS A. JANNEY.
ALPHA G. JOHNSON.
CHARLES M. NOKES